March 31, 1925.
L. SIMMONS
ELECTRIC HEATER
Filed April 18, 1923
1,531,515
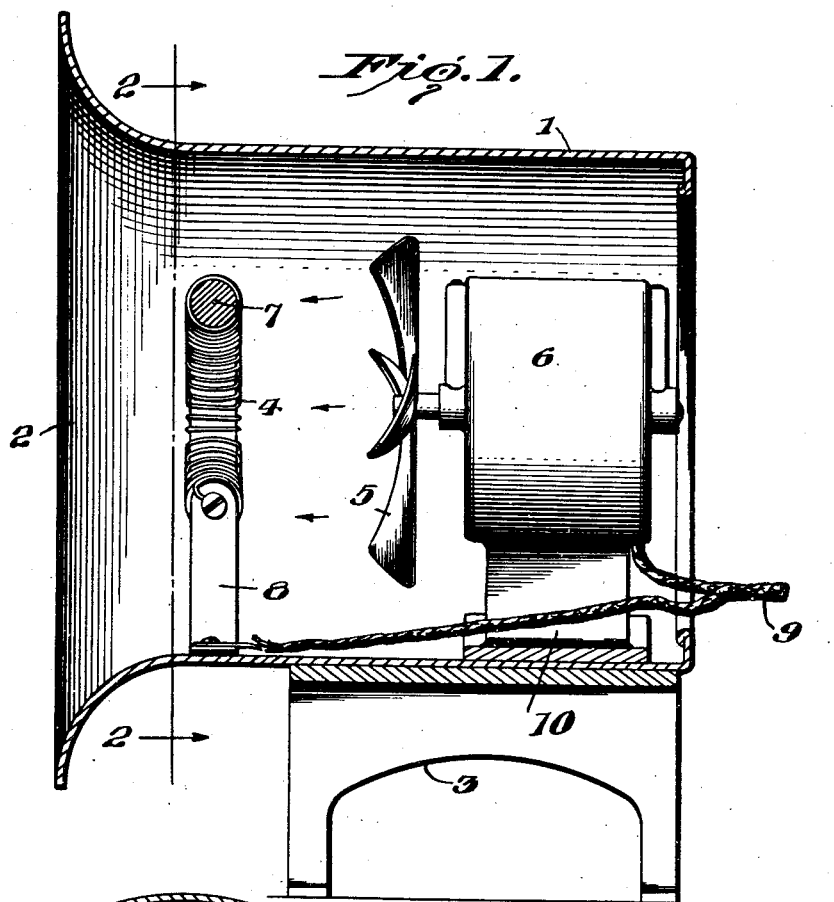
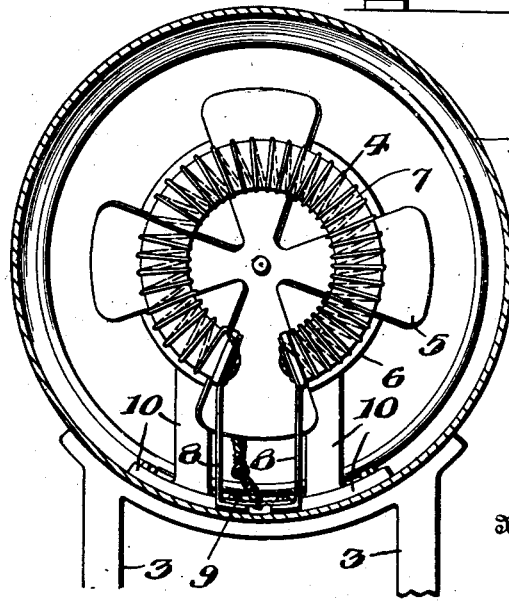
Inventor
Leo Simmons
By Hubert E. Peck
Attorney Patented Mar. 31, 1925.

1,531,515

UNITED STATES PATENT OFFICE.

LEO SIMMONS, OF WASHINGTON, DISTRICT OF COLUMBIA.

ELECTRIC HEATER.

Application filed April 18, 1923. Serial No. 632,887.

*To all whom it may concern:*

Be it known that I, LEO SIMMONS, a citizen of the United States of America, and a resident of Washington, District of Columbia, have invented certain new and useful Improvements in and Relating to Electric Heaters, of which the following is a specification.

This invention embodies an electric conductor adapted to become heated to a glow, red heat or incandescence cooperatively arranged with respect to an electric fan or blower for constantly moving a great volume of air into and from the zone heated by such conductor; and the objects and nature of the invention will be readily understood by those skilled in the art in the light of the following explanations of the accompanying drawings that illustrate what I now believe to be the preferred mechanical expression or embodiment of my invention.

An object of the invention is to provide an electric heater, particularly of the portable type for domestic or office use, wherein approximately the maximum room heating capacity of a heating coil or the like will be utilized by combining such heating element in an improved manner with respect to means for setting the air of the room into circulation and driving a rapidly moving column of such air into contact with and through the zone heated by such coil.

With this and other objects in view my invention consists in certain novel features in construction and in combinations and arrangements as more fully and particularly set forth and specified hereinafter.

Referring to the accompanying drawings:

Fig. 1 shows a heater of my invention in longitudinal vertical section.

Fig. 2 is a cross section on the line 2—2, Fig. 1.

In the particular embodiment illustrated, I provide a horizontally arranged tubular open-end housing 1, that is flared or bell-shaped toward the front 2, preferably to serve to a degree as a heat radiator or reflector, and this housing is fixed on and upheld by any suitable supporting base or feet 3, adapted to rest on the floor or other suitable support, whereby the device is rendered portable and the housing is maintained in horizontal position.

I arrange any suitable electric resistance conductor 4 within the housing and directly within the path of the air blast produced by air moving means, such as a blower or fan 5 preferably propelled by an electric motor 6, driven preferably by electric current from the same source of power utilized to heat the conductor 4 preferably to incandescence or to a glow or red heat.

In the example illustrated, the element to be heated to incandescence or otherwise preferably to a temperature at which the element glows, is arranged within the housing transversely of the longitudinal axis thereof. For instance, I show this element in the form of a vertical coil 4 located about centrally within the bell or front end of the housing and spaced from the surrounding wall thereof, with the coil of approximately ring or annular form, or of approximate horseshoe shape with its ends separated. This coil is supported by and surrounds a refractory core 7 of split ring or approximately annular shape that is fixed to and upheld by a suitable bracket or posts 8 rising from and fixed to the floor of the housing. These supporting posts 8 are, in this instance, insulated from each other and from the housing 1, and form the electric leads to the heating coil 4, and these leads are electrically connected into circuit with the motor from which wires extend through cable 9 for plugging into the power circuit of the building in the usual or any suitable manner. The arrangement can be such that the power current will be simultaneously applied to both coil 4 and motor 6, to start the blower when the coil begins to heat. However, I prefer, separate electric circuit controlling means for independently throwing the coil 4 and the blower motor into and from the power circuit, during the summer the heater can be cut out and the fan used for cooling.

The blower 5 and its motor 6, constitute a unit provided with base 10 fixed to the floor of the housing in such manner that the blower is elevated and its axis is approximately alined with the longitudinal axis of the housing and arranged directly behind and alined with the heating coil 4.

The motor 6 is arranged in the rear portion of the housing with its fan or blower 5 spaced rearwardly a distance from the heating coil and arranged to direct a rapidly moving air blast forwardly within the housing and directly against said coil. The vertical plane of the coil is approximately parallel with the vertical plane of the fan and said planes are at right angles to the longitudinal axis of the housing, and the longitudinal axis of the approximately annular coil is approximately alined with the axis of the fan and with the longitudinal axis of the housing, although I do not wish to so limit my invention.

In action, the heater is preferably located in the zone of cool air near the floor of a room and the rapidly rotating fan or blower draws the air from the the room into the rear end of the housing and drives the same against the hot coil and its core and thereby heats the air which is rapidly discharged from the front or bell end of the housing into and circulated throughout the room. I find by experience, that the temperature of a room can be rapidly raised by the use of my invention without setting up objectionable drafts.

The tubular housing combined with the blower sets up an air blast that is confined to and heated by the coil and by passing through the zone of heat created by the coil which zone usually extends to the wall of the housing surrounding the coil. Furthermore, the flare or bell of the housing and the glowing coil therein, also tend to assist in heating by radiation and conduction, in addition to the heating action by convection.

What I claim is:—

An electric heater comprising an open-front longitudinal housing at its rear end having an air inlet, an electric fan carried by the housing and arranged to maintain a forward forced air circulation through said housing entering at the rear and discharging at the front thereof, and means transversely arranged centrally within the front part of the housing for heating the circulating air and providing an open central air passage in front of and alined with the fan axis, said means embodying an electric glow coil or resistance and a supporting body therefor, said resistance and body being of looped or approximately encircling form to provide said central air passage, said body being stationarily supported and spaced from the surrounding housing wall, said body formed to be heated by said electric resistance to aid in heating the air.

Signed at Washington, D. C., this 18th day of April, 1923.

LEO SIMMONS.